Figure 4:
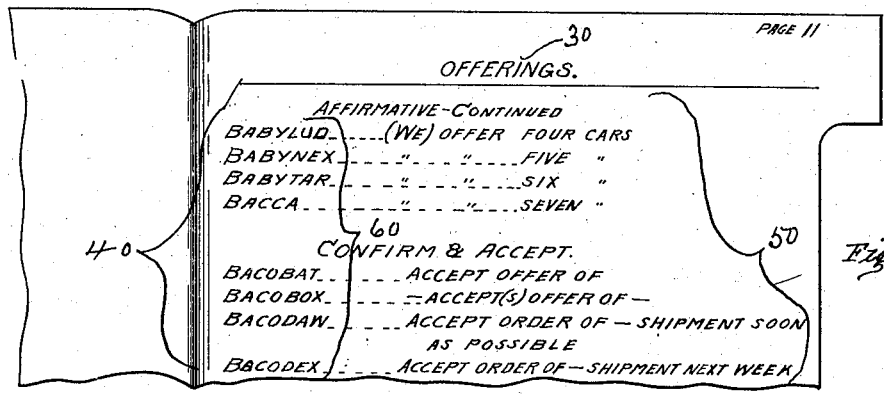

No. 791,209. PATENTED MAY 30, 1905.
E. PEYCKE.
MARGINAL AND SUB INDEX FOR TELEGRAPHIC CIPHER CODES.
APPLICATION FILED OCT. 1, 1903.
3 SHEETS—SHEET 1.
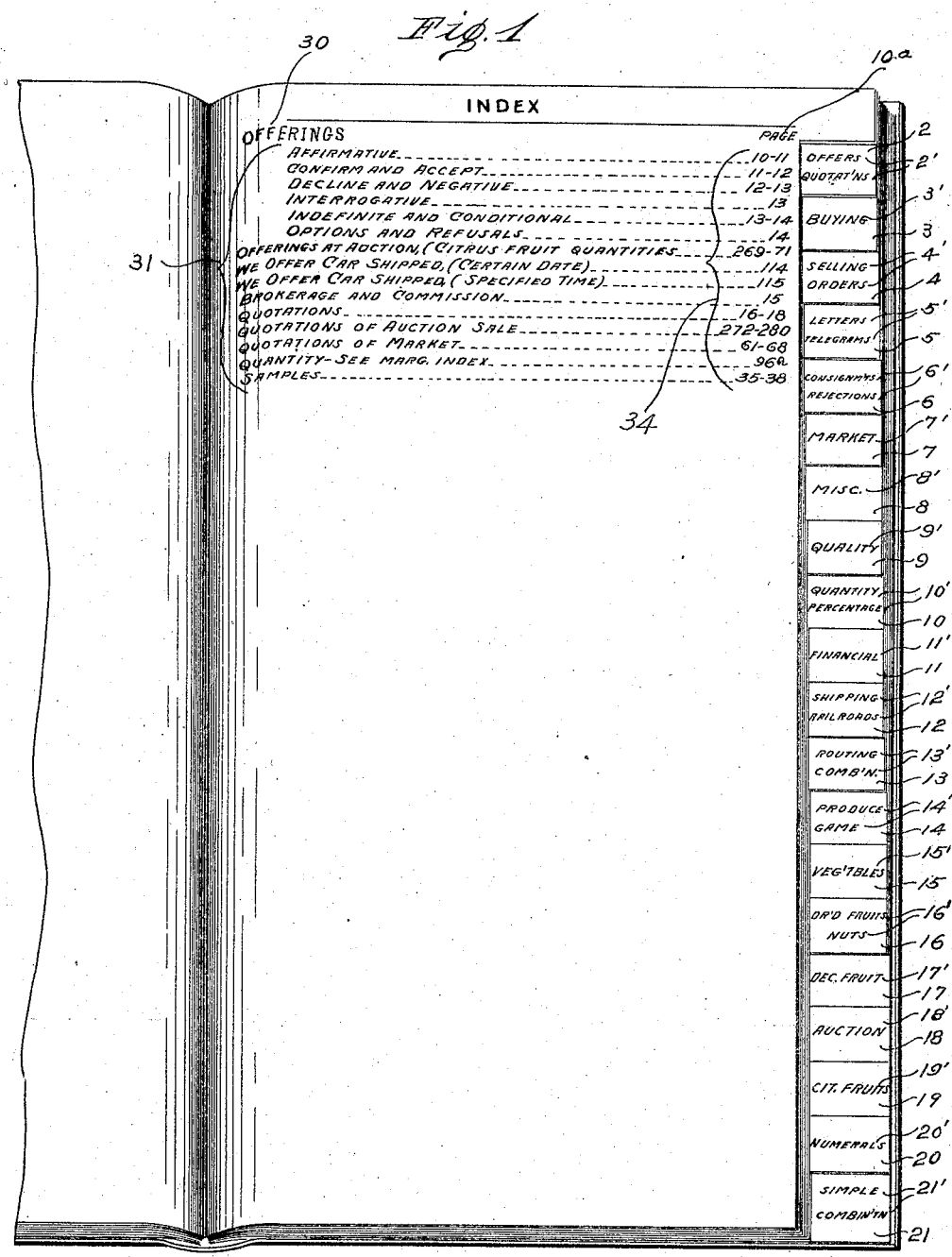

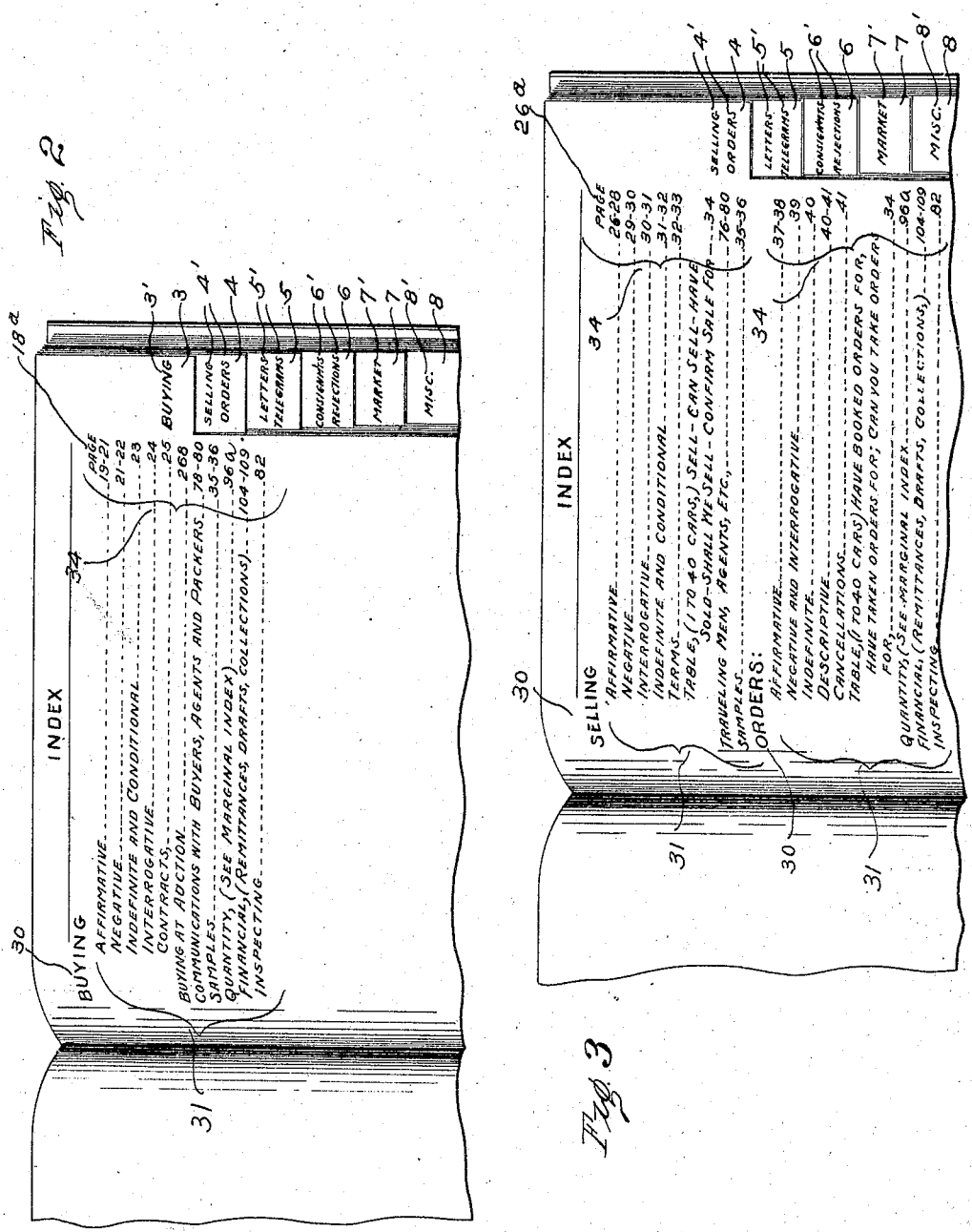

No. 791,209. PATENTED MAY 30, 1905.
E. PEYCKE.
MARGINAL AND SUB INDEX FOR TELEGRAPHIC CIPHER CODES.
APPLICATION FILED OCT. 1, 1903.

3 SHEETS—SHEET 3.

Witnesses
Inventor
Edmund Peycke
by
James R. Rogers
Attorney

No. 791,209. Patented May 30, 1905.

UNITED STATES PATENT OFFICE.

EDMUND PEYCKE, OF LOS ANGELES, CALIFORNIA.

MARGINAL AND SUB INDEX FOR TELEGRAPHIC CIPHER-CODES.

SPECIFICATION forming part of Letters Patent No. 791,209, dated May 30, 1905.

Application filed October 1, 1903. Serial No. 175,387.

*To all whom it may concern:*

Be it known that I, EDMUND PEYCKE, a citizen of the United States, residing in Los Angeles, in the county of Los Angeles, State of California, have invented and discovered a new and useful Marginal and Sub Index for Telegraphic Cipher-Codes; and I do hereby declare the following to be a full, clear, and exact description of the invention, such as will enable others skilled in the art to which it appertains to make and use the same.

This invention relates to improvements in marginal and sub index for telegraphic cipher-codes; and the objects of my improvement are, first, to construct a book for a cipher-code having lateral marginal projections upon leaves thereof on which a marginal index is printed, written, stamped, cut, carved, inlaid, engraved, or otherwise placed thereon, consisting of a "generic" word or words; second, to print, write, stamp, or otherwise place upon pages of a book containing a cipher-code a subindex comprising the generic word or words of the marginal index and thereunder on the same page print, write, stamp or otherwise place thereon a "specific" word or words having a detailed and related meaning to and under the generic word or words printed or otherwise placed upon the projections of pages of the book constituting the marginal index; third, to select and to print or otherwise place upon, preferably at the top of a separate page or pages embraced within the body of the book, the one or more specific words, phrases, clauses, and sentences of the subindex and to print the reference to other pages of the book of the specific word or words embraced within the body of the book for detailed information, and, fourth, to select and to print or otherwise place on pages included in the body portion of the book, preferably at the top of the pages, a surindex comprising a generic word or words, desirably that on the marginal projection of the book, and thereunder a specific word or words contained in the subindex forming a part thereof and "variety" words under the specific words, and on the same line or lines with the variety word or words to select and to arrange a single corresponding "arbitrary" word for each variety word or words designed to be transmitted electrically from one person or place to another.

The word "surindex," hereinbefore mentioned and hereinafter employed in the specification and claims, denotes an auxiliary index, a supplemental index, a part of the completed code. It sustains the same relation to the subindex that the subindex bears to marginal index upon the projections forming parts of the leaves of the book containing the code.

I obtain these objects by construction, selection, and printed arrangement of words and characters, illustrated upon the accompanying drawings, in which—

Figure 5:
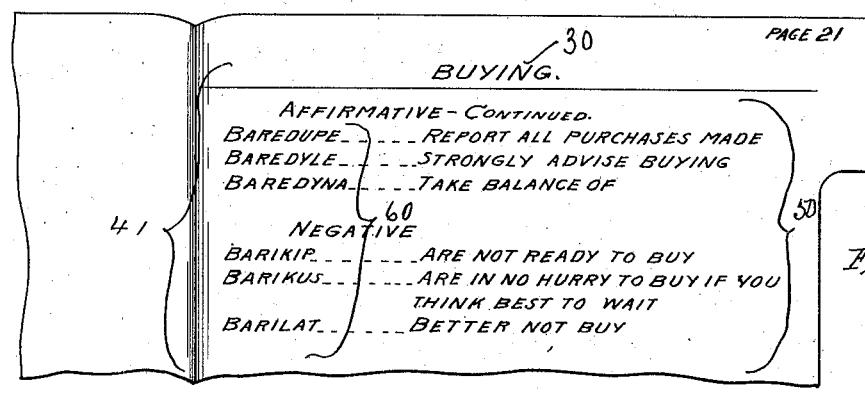
Figure 6:
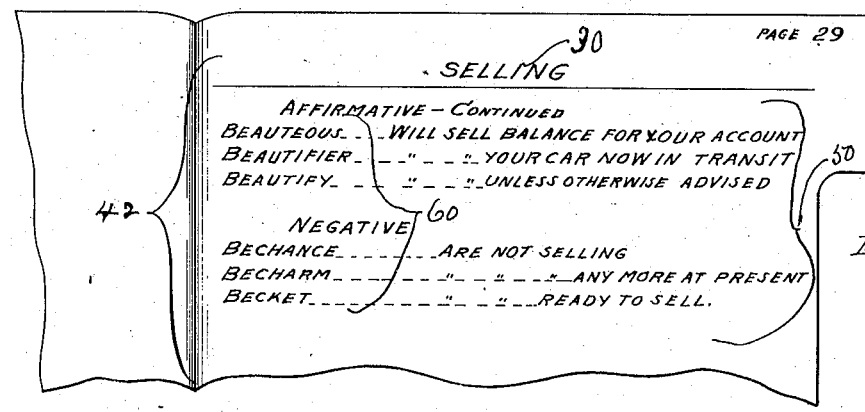

Figure 1 is a view in elevation showing the book open, illustrating one entire page thereof and the opposite page broken away longitudinally. Fig. 2 is a view in elevation of the upper portion of the book and the lower portion thereof broken away. Fig. 3 is a like view to that illustrated upon Fig. 2 of the drawings, showing a part of a different page of the book. Fig. 4 is a view in elevation of a portion of the upper part of a leaf of the book on which a part of the surindex may be printed, the central and lower portion of the leaf broken away. Fig. 5 is a view in elevation of portions of a leaf of the book, showing parts of the surindex, the variety words, and corresponding arbitrary words printed thereon and the central and lower portion of the leaf broken away. Fig. 6 is a view in elevation of portions of a leaf of the book on which parts of the surindex, variety words, and corresponding arbitrary words are printed, the lower portion of the leaf broken away.

Similar reference-numerals refer to like parts throughout the several views.

The reference-numerals 2, 3, 4, 5, 6, 7, 8, 9, 10, 11, 12, 13, 14, 15, 16, 17, 18, 19, 20, and 21 refer to a group of two or more leaves of the book containing the code on which are formed lateral projections. On the projections of the first leaf of each of said group of leaves comprising the book I select and arrange, write, print, stamp, cut, carve, inlay, engrave, or otherwise place thereon one or more generic words employed and known in trading, as appear upon the drawings, by the reference-numerals 2′, 3′, 4′, 5′, 6′, 7′, 8′, 9′, 10′, 11′, 12′, 13′, 14′, 15′, 16′, 17′, 18′, 19′, 20′, and 21′. The construction of those lateral marginal projections made integral with the leaves of the book and the selection, arrangement, and placing of the words of comprehensive meaning thereon constitute the marginal index. The subindex I preferably place upon the first page of each of the said groups of leaves forming the code hereinbefore referred to, and it (subindex) comprises a single word or words having comprehensive meaning—as, for example, the heading 30 upon figures of the drawings. I preferably select for such heading the word or words appearing upon the lateral marginal projection formed upon the same leaf of the book.

The generic word or words 30 having been chosen and preferably been placed at the upper left-hand corner of the same page of the book, said pages 10$^a$, 18$^a$, 26$^a$, 11, 21, and 29, shown, respectively, upon Figs. 1, 2, 3, 4, 5, and 6 of the drawings, as before referred to, I select and arrange and print thereunder a vertical column of words, phrases, clauses, or sentences 31, each having a more definite meaning than the word or words chosen as a heading for a subindex. On the same line or lines, near the outer margin of the page on which the said column of words is placed having more definite meanings, I print or otherwise place thereon page reference-numerals 34. These are designed to indicate that on said pages to which the said numerals refer the surindex appears hereinafter more particularly described. Each surindex, as shown upon Figs. 4, 5, and 6 of the drawings, and referred to, respectively, by the reference-numerals 40, 41, and 42, includes one of the sets of comprehensive generic word or words 30, hereinbefore referred to, appearing upon one of the lateral marginal projections, as a heading for the surindex, and I preferably print the same at the top of each page of the book including the said index. To these pages of the surindex the page reference-numerals 34 (shown upon the Figs. 1, 2, and 3 of the drawings) refer. In addition to the said comprehensive generic word or words 30, chosen as a heading preferably placed at the top of each page embracing the surindex, thereunder I select and arrange and print or otherwise place thereon two vertical columns of words 50 and 60. One column, 50, consists of words, phrases, clauses, and sentences denominated "variety" words. The other column, 60, is made up of a series of single arbitrary words each arranged on a line with one of the words, phrases, clauses, or sentences in the first-mentioned column 50, hereinbefore referred to as "variety" words.

Whenever one of these variety words—the said phases, clauses, or sentences contained in column 50 first referred to—expresses the ideas one person desires to communicate electrically to another at a distance, the single corresponding arbitrary word in column 60 on the same line as the variety word or variety words in the opposite column 50 is transmitted to the person desiring information. Each person in communication being in possession of a copy of the book containing the code, the same definite information is conveyed by the single arbitrary word transmitted as would be conveyed by the corresponding variety word or words in the opposite column. By the transmission of these single arbitrary words the expense for telegraphing is greatly lessened to the persons concerned.

The operation of this invention will be readily understood from the foregoing description, taken in connection with the drawings appended hereto.

It is obvious that many variations and changes in the details of construction, selection, and arrangement of my invention would readily suggest themselves to persons skilled in the art and still be within the spirit and scope of my invention.

I do not desire to confine this invention to the specific construction, selection, and arrangement of parts herein shown and described, and the right is reserved to make all changes in and modifications of the same as come within the spirit of this invention; but I do desire to secure as my invention all features of construction and equivalents thereof, selections, and arrangements that come within the scope of my improvement as herein shown and described, and illustrated upon the drawings appended hereto.

Having described my invention, what I do claim, and desire to secure by Letters Patent, is—

1. In a telegraphic cipher-code, a marginal index comprising lateral projections formed upon the leaves of a book containing the code, said projections having thereon a "generic" word or words appertaining to the trade to which the code relates, a subindex comprising the said "generic" word or words "specific" word or words, and reference page-numbers upon the same leaf of the book as that on which the said "specific" word or words are placed and a surindex including therein "arbitrary" words.

2. A telegraphic cipher-code comprising lateral marginal projections formed upon the leaves of a book containing the code, said projections having thereon a "generic" word or words relating to the particular trade in which the said code is intended to be used, a subindex consisting of the said "generic" word or words upon the said marginal projections, a "specific" word or words, phrases, clauses, sentences, and reference page-numbers, in combination with a surindex including therein a column of single "arbitrary" words to be communicated from one person to another.

3. A telegraphic cipher-code comprising a marginal index having lateral marginal projections formed upon the leaves of a book, said projections having thereon a "generic" word or words related to the subject-matter of the code, a subindex comprising the said "generic" word or words, a "specific" word or words to the said "generic" word or words and reference page-numbers; and a surindex consisting of "variety" words and a single "arbitrary" word corresponding with each "variety" word.

4. A telegraphic cipher-code comprising a marginal index having lateral projections formed upon the leaves of a book, the said projections having thereon a "generic" word or words, a subindex upon the same page of the leaf of the book as that on which the "generic" word or words upon the marginal projections are placed, in combination with a surindex comprising "variety" words and a single "arbitrary" word corresponding with each "variety" word, the said "arbitrary" word to be transmitted at a distance from one person to another.

In testimony whereof I have signed my name to this specification in the presence of two subscribing witnesses.

EDMUND PEYCKE.

Witnesses:
   C. B. WILMARTH,
   HONOR J. CRANLEY.